United States Patent
Hiramatsu et al.

(10) Patent No.: US 7,626,293 B2
(45) Date of Patent: Dec. 1, 2009

(54) MOTOR HAVING CONTROL CIRCUIT MEMBER

(75) Inventors: Ritsurou Hiramatsu, Kosai (JP); Hiroaki Yamamoto, Kosai (JP); Katsumi Endo, Kosai (JP)

(73) Assignee: ASMO Co., Ltd., Shizuoka-pref (JP)

( * ) Notice: Subject to any disclaimer, the term of this patent is extended or adjusted under 35 U.S.C. 154(b) by 490 days.

(21) Appl. No.: 11/505,312

(22) Filed: Aug. 17, 2006

(65) Prior Publication Data

US 2007/0069595 A1 Mar. 29, 2007

(30) Foreign Application Priority Data

Aug. 23, 2005 (JP) ............... 2005-241602

(51) Int. Cl.
*H02K 1/32* (2006.01)
(52) U.S. Cl. ...................................... 310/64; 310/68 R
(58) Field of Classification Search ............... 310/68 R, 310/239, 71, 89, 64
See application file for complete search history.

(56) References Cited

U.S. PATENT DOCUMENTS

| 5,528,093 A | 6/1996 | Adam et al. |
| 5,619,108 A | 4/1997 | Komurasaki et al. |
| 5,939,807 A * | 8/1999 | Patyk et al. .................. 310/89 |
| 2005/0082925 A1 * | 4/2005 | Yamamoto et al. ............ 310/89 |

FOREIGN PATENT DOCUMENTS

DE 4242641 6/1994

* cited by examiner

*Primary Examiner*—Quyen Leung
*Assistant Examiner*—Leda Pham
(74) *Attorney, Agent, or Firm*—Posz Law Group, PLC

(57) ABSTRACT

A first heat releasing member, which is made from a metal plate material, is fitted into a circuit receiving recess, which receives a control circuit member. A second heat releasing member, which is made from a metal plate material and includes a resilient contact portion, is placed over the first heat releasing member. The resilient contact portion resiliently contacts a drive control IC of the control circuit member.

11 Claims, 9 Drawing Sheets

US 7,626,293 B2

MOTOR HAVING CONTROL CIRCUIT MEMBER

CROSS REFERENCE TO RELATED APPLICATION

This application is based on and incorporates herein by reference Japanese Patent Application No. 2005-241602 filed on Aug. 23, 2005.

BACKGROUND OF THE INVENTION

1. Field of the Invention

The present invention relates to a motor that has a control circuit member, in which a drive control IC is installed.

2. Description of Related Art

One previously proposed motor, which is used in, for example, a power window system, includes a motor main body, a speed reducer and a control circuit member. The motor main body rotates upon energization thereof. The speed reducer reduces a speed of rotation generated from the motor main body. The control circuit member controls the rotation of he motor main body. Recently, there has been proposed a control circuit member of the above type, which has a drive control IC (an IC, which has a transistor).

Japanese Unexamined Patent Publication No. H08-33296 (corresponding to U.S. Pat. No. 5,619,108) recites a vehicle AC generator (alternator), which has an IC for controlling a voltage. The IC generates heat at the time of operation thereof. In order to release the heat from the IC, a heat sink made of metal is fixed to a side surface of the IC with screws.

In the above case, besides the use of the screws, the heat sink may be fixed to the surface of the IC with bond. However, in each of these cases, it takes time to fix the heat sink to the IC, thereby resulting in a tedious time consuming work for the installation of the heat sink and the entire assembling of the motor.

SUMMARY OF THE INVENTION

The present invention addresses the above disadvantage. Thus, it is an objective of the present invention to provide a motor, which has a control circuit member having a drive control IC that is provided with a more easily installable heat releasing member for releasing heat form the drive control IC.

To achieve the objective of the present invention, there is provided a motor, which includes a motor main body, a gear housing, a control circuit member, a circuit receiving case and at least one heat releasing member. The motor main body includes a brush holder, which holds a plurality of power supply brushes. The gear housing is assembled together with the motor main body and receives a speed reducing mechanism, which reduces a speed of rotation generated in the motor main body. The control circuit member is installed to the brush holder. The control circuit member includes a drive control IC and is electrically connected to the brush holder to control the rotation of the motor main body through the plurality of power supply brushes. The circuit receiving case receives the control circuit member. The least one heat releasing member is made of metal and is fitted to or is placed over a portion of the circuit receiving case such that the at least one heat releasing member is connected to the drive control IC to release heat from the drive control IC. The at least one heat releasing member includes a resilient contact portion, which resiliently contacts the drive control IC.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A motor 1 for a vehicle power window system according to a first embodiment of the present invention will be described with reference to the accompanying drawings.

Figure 1:
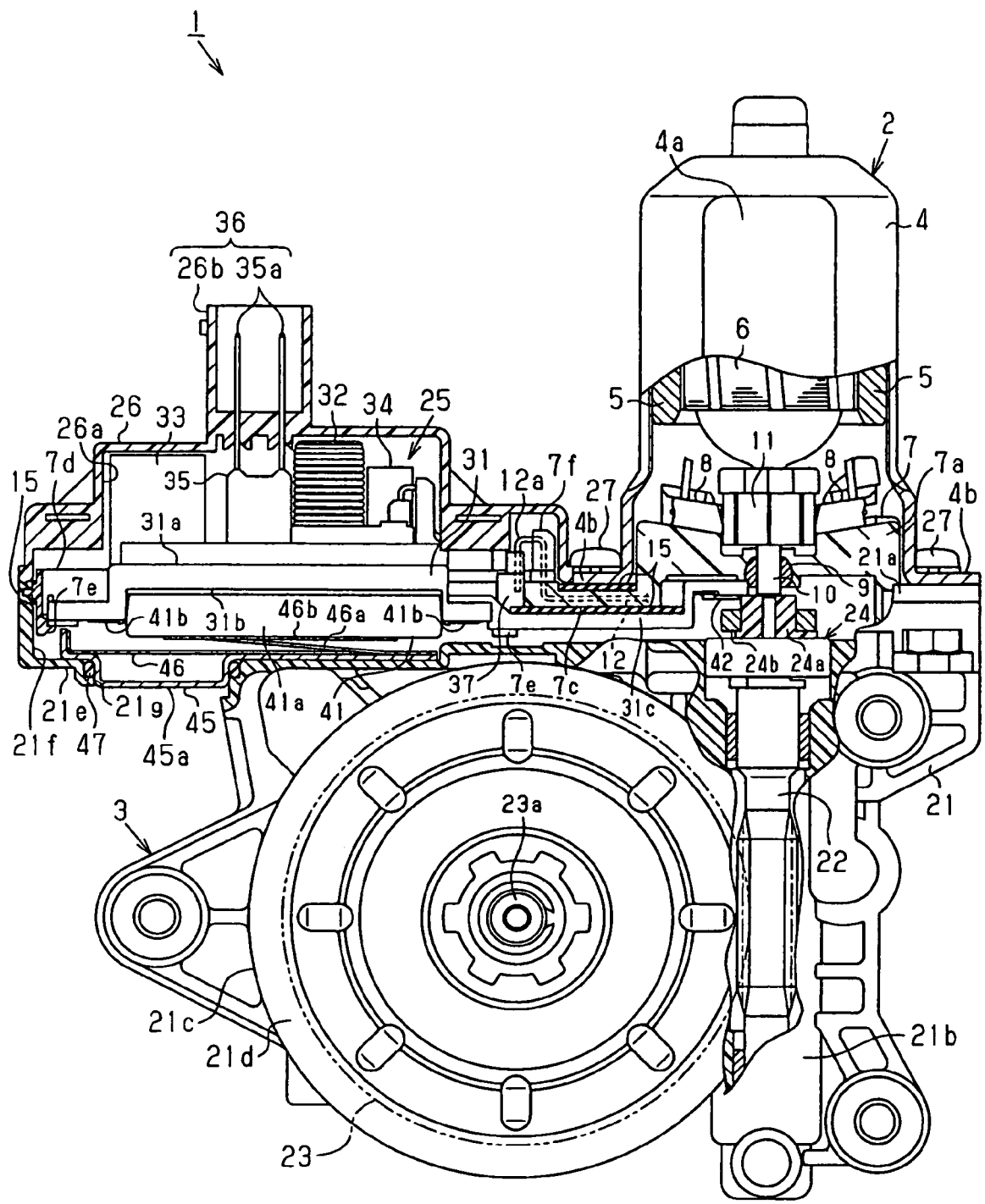
FIG. 1 is a cross sectional view of an assembled motor according to a first embodiment of the present invention.
Figure 2:
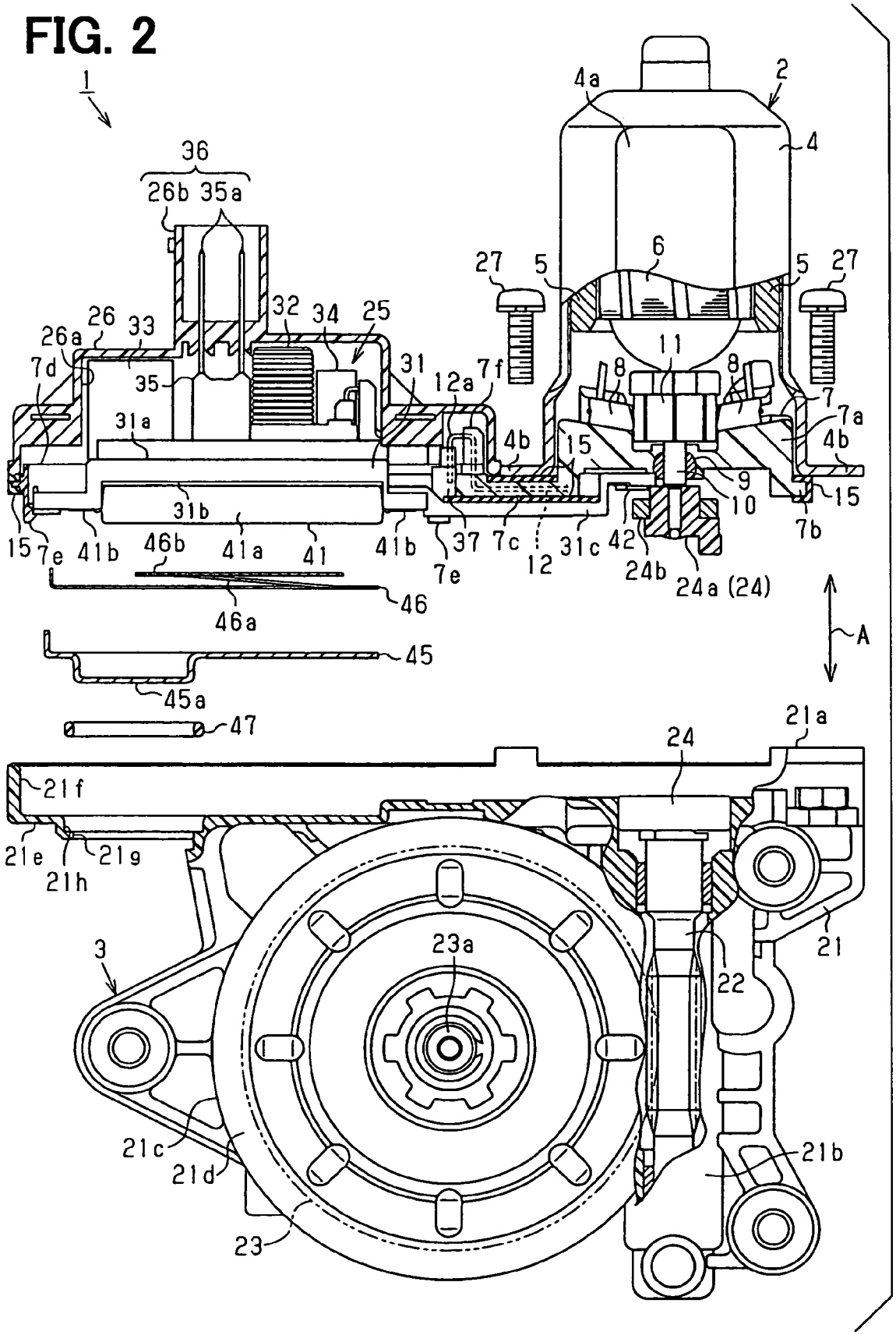
FIG. 2 is a partially cross sectional exploded view of the motor, showing a state before assembling of the motor.

As shown in FIGS. 1 and 2, the motor 1 includes a motor main body 2 and a speed reducer 3. The motor main body 2 rotates upon energization thereof. The speed reducer 3 reduces a speed of the rotation generated in the motor main body 2.

The motor main body 2 includes a yoke housing (hereinafter, simply referred to as a yoke) 4, two permanent magnets 5, an armature 6, a brush holder 7 and two power supply brushes 8. The yoke 4 is shaped into a generally flattened cup-shaped body having a closed bottom. The magnets 5 are secured to an inner peripheral surface of the yoke 4. The armature 6 is rotatably supported in the yoke 4.

The brush holder 7 is made of a resin material and includes a holder main body 7a, a flange 7b, an extension 7c and a frame 7d. The holder main body 7a is configured to be substantially received in an opening of the yoke 4. A bearing 9 is fixed to a center hole of the holder main body 7a to rotatably support a distal end of a rotatable shaft 10 of the armature 6. The power supply brushes 8 are slidably held by the holder main body 7a at a yoke 4 interior side of the holder main body 7a in such a manner that the power supply brushes 8 are radially inwardly urged against a commutator 11, which is secured to the rotatable shaft 10, to form an electrical contact therebetween.

Figure 4:
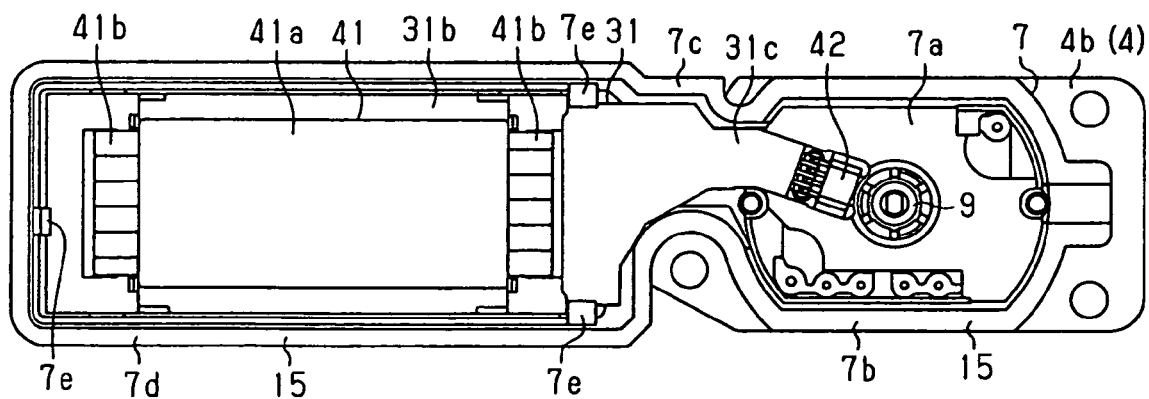
FIG. 4 is a plan view of an opening of a yoke housing of the motor, to which a brush holder is installed.

The flange 7b extends radially outward from the holder main body 7a in a direction away from the rotatable shaft 10. The extension 7c is located on one lateral side of the yoke 4 and extends from an outer peripheral part of the flange 7b in a direction parallel to a plane of a flat surface 4a of the yoke 4, i.e., extends in an extending direction of a wheel receiving portion 21c with respect to a worm receiving portion 21b of a gear housing 21 described below. As shown in FIG. 4, the frame 7d, which has a generally rectangular cross section, is formed in a distal end of the extension 7c. A control circuit member 25, which will be described below, is arranged inside of the frame 7d. Three installation pieces (claws) 7e are provided at three points along inner peripheral edges of the frame 7d to allow install the control circuit member 25 in the frame 7d.

The flange 7b, the extension 7c and the frame 7d are covered with a seal member 15, which is made of an elastic material (e.g., an elastomer). Specifically, the flange 7b and the extension 7c, which are covered with the seal member 15, are engaged with an opening of the yoke 4 and an opening of a fixing portion 21a of the gear housing 21, to which the yoke 4 is fixed. With this arrangement, the opening of the yoke 4 and the opening of the fixing portion 21a of the gear housing 21 are effectively sealed with the seal member 15, which coves the flange 7b and the extension 7c. Furthermore, the frame 7d, which is covered with the seal member 15, engages an opening of a circuit receiving portion 21e (a receiving recess 21f) of the gear housing 21 and an opening of a cover 26, which closes an opening of the circuit receiving portion 21e. With this arrangement, the opening of the circuit receiving portion 21e of the gear housing 21 and the opening of the cover 26 are effectively sealed with the seal member 15, which covers the frame 7d.

As shown in FIGS. 1 and 2, a plurality of terminals 12, each of which is made of a corresponding metal plate material, is embedded (insert molded) into the brush holder 7. Base ends of the terminals 12 are exposed on the yoke 4 interior side of the holder main body 7a and are electrically connected to the power supply brushes 8 through pigtails, respectively. Electrical contacts 12a, which are provided to distal ends of the terminals 12, protrude from a connecting portion 7f, which is provided to a distal end of the extension 7c, and are electrically connected to the control circuit member 25.

The speed reducer 3 includes the gear housing 21, a worm shaft 22, a worm wheel 23 and a clutch 24.

The gear housing 21 is made of a resin material and includes the fixing portion 21a, the worm receiving portion 21b and the wheel receiving portion 21c. The fixing portion 21a is configured to correspond with the shape of the flange 4b, which is formed at the opening of the yoke 4. The flange 4b is fixed to the fixing portion 21a with screws 27. At this time, the fixing portion 21a cooperates with the flange 4b to clamp the flange 7b and the extension 7c of the brush holder 7 therebetween through the seal member 15. With this construction, the opening of the yoke 4 and the opening of the fixing portion 21a are effectively sealed with the seal member 15.

The worm receiving portion 21b is shaped into a tubular body, which extends along an imaginary extension line of the rotatable shaft 10. The worm receiving portion 21b rotatably supports the worm shaft 22 therein. The clutch 24 is provided to a motor main body 2 side of an interior of the worm receiving portion 21b. The clutch 24 connects between the worm shaft 22 and the rotatable shaft 10 in a manner that allows transmission of a drive force therebetween. When the drive force is transmitted from the rotatable shaft 10 to the clutch 24, the clutch 24 transmits the drive force from the rotatable shaft 10 to the worm shaft 22. In contrast, when a drive force is transmitted from the worm shaft 22 to the clutch 24, the clutch 24 blocks rotation of the worm shaft 22 to limit transmission of the drive force from the worm shaft 22 to the rotatable shaft 10. That is, the clutch 24 is provided to limit the rotation of the motor 1, which would be caused by the force applied from a load side (e.g., a load applied to an undepicted window glass in a downward direction) of the power window system. In this way, inadvertent opening movement of the window glass is advantageously limited.

As shown in FIG. 2, at the time of assembling the motor main body 2 (the yoke 4) and the speed reducer 3 (the gear housing 21) together in an assembling direction A, a driving side rotatable body 24a, which is a part of the clutch 24, is preinstalled to the distal end of the rotatable shaft 10. Then, at the time of the assembling the motor main body 2 and the speed reducer 3 together, the driving side rotator 24a is received in a main body of the clutch 24 to complete the assembling of the clutch 24. An annular sensor magnet (a ring magnet) 24b is installed to the driving side rotatable body 24a to rotate integrally with the driving side rotatable body 24a. The sensor magnet 24b is provided to sense, for example, a rotational speed of the rotatable body 24a and thereby of the rotatable shaft 10, which is rotated together with the rotatable body 24a.

The wheel receiving portion 21c is shaped into a circular disk like body, which extends from the worm receiving portion 21b. The wheel receiving portion 21c rotatably supports the worm wheel 23 therein. A flat surface 21d of the wheel receiving portion 21c extends generally parallel to the flat surface 4a of the yoke 4. The gear housing 21 and the yoke 4 are formed to have a low profile to achieve a low profile of the motor 1. An interior of the worm receiving portion 21b and an interior of the wheel receiving portion 21c are connected with each other at a connection where the worm shaft 22 and the worm wheel 23 are meshed with each other. An output shaft 23a is connected to the worm wheel 23 at one end and is connected to a window regulator (not shown) at the other end. When the motor main body 2 is rotated, the output shaft 23a is rotated through the worm shaft 22 and the worm wheel 23 to drive the window regulator, so that the window glass is raised or lowered by the window regulator.

Figure 5:
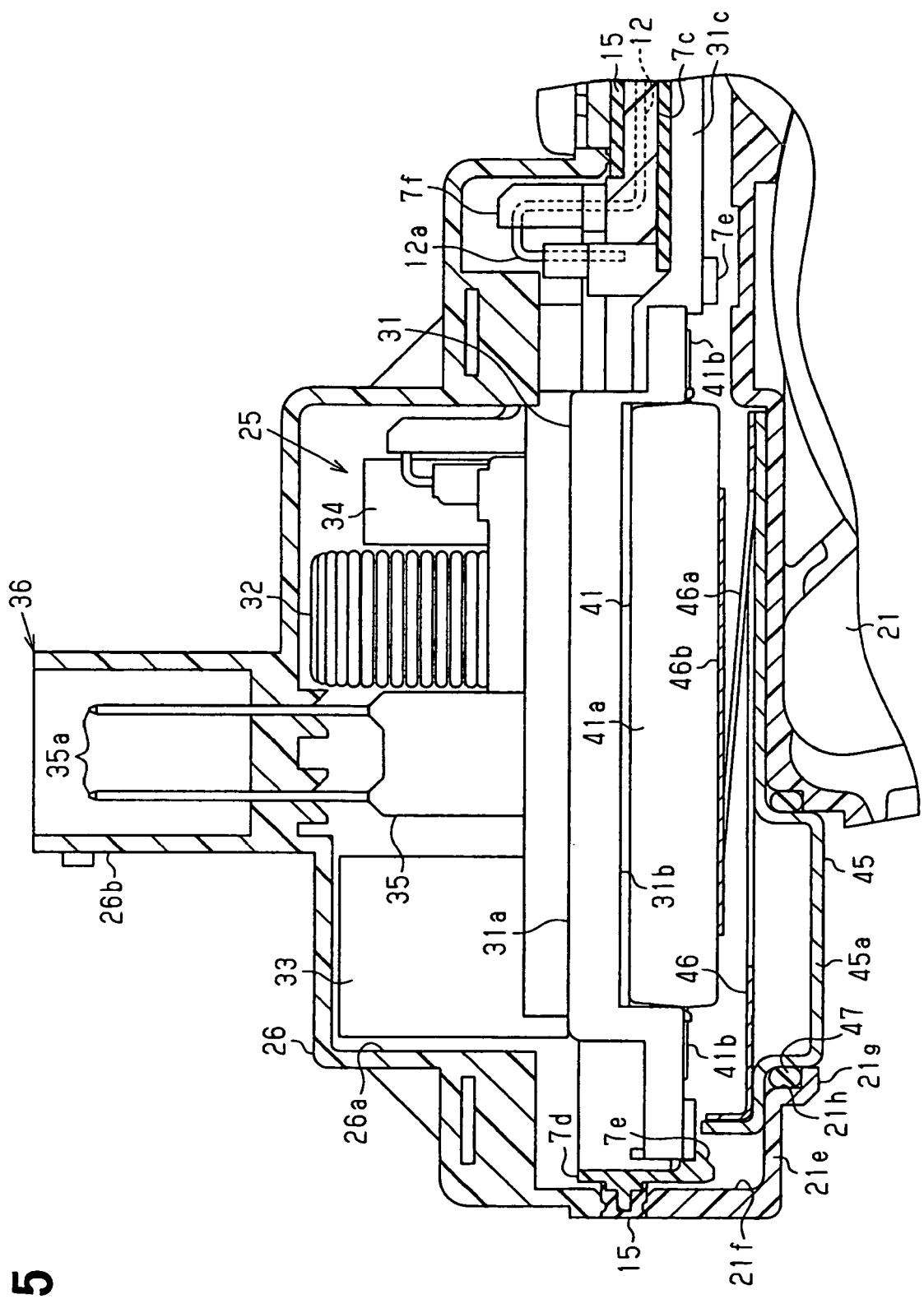
FIG. 5 is a partial enlarged view of the motor, showing a control circuit member and components therearound.

As shown in FIGS. 1, 2 and 5, the gear housing 21 has the circuit receiving portion 21e, which is arranged on a wheel receiving portion 21c side of the fixing portion 21a. The circuit receiving portion 21e has the receiving recess 21f, which has a generally rectangular cross section and is opened on a side (a motor main body 2 side), which is opposite from the wheel receiving portion 21c in the axial direction of the rotatable shaft 10. The frame 7d of the brush holder 7 is arranged in the opening of the circuit receiving portion 21e (the receiving recess 21f). A base 31 of the control circuit member 25, which controls the rotation of the motor main body 2, is installed to the installation pieces 7e of the frame 7d. A generally lower half of the control circuit member 25 is received in the receiving recess 21f.

The resin cover 26 is installed to the circuit receiving portion 21e in such a manner that the frame 7d is interposed between the resin cover 26 and the circuit receiving portion 21e, and the opening of the circuit receiving portion 21e (the receiving recess 21f) is closed by the cover 26. The resin cover 26 has a receiving recess 26a, which receives the rest of the control circuit member 25. The cover 26 and the circuit receiving portion 21e cooperate together to clamp the frame 7d therebetween through the seal member 15, so that the opening of the circuit receiving portion 21e and the opening of the cover 26 are effectively sealed with the seal member 15.

The control circuit member 25 has the base 31, which is shaped into a generally plate form and is made of a resin material. The base 31 includes mount surfaces 31a, 31b, which are arranged at opposed sides, respectively, of the base 31, which are opposed in a direction parallel to the rotational axis of the rotatable shaft 10. The base 31 is received in the receiving recesses 21f, 26a in such a manner that the mount surfaces 31a, 31b are perpendicular to the flat surface 4a of the yoke 4 and the flat surface 21d of the wheel receiving portion 21c.

A choke coil 32 and capacitors 33, 34 are mounted to the mount surface 31a of the base 31, which is located on the cover 26 side of the base 31. The choke coil 32 and the capacitors 33, 34 are provided to limit electromagnetic noise, which is caused by the sliding contact of the power supply brushes 8 and PWM control operation of a drive control IC 41.

A connector main body 35, which supports a plurality of electrical contacts 35a, protrudes from the mount surface 31a. A connector case portion 26b, which is shaped into a quadrangular tube, protrudes from the cover 26 at a location, which corresponds to the connector main body 35. The connector case portion 26b protrudes in a direction perpendicular to the mount surface 31a of the base 31, i.e., protrudes in the axial direction of the rotatable shaft 10. The electrical contacts 35a are inserted in the interior of the connector case portion 26b to form the connector 36 of the motor 1. A vehicle body side connector (not shown) is electrically connected to the connector 36 in the axial direction of the rotatable shaft 10 to provide the electric power from the vehicle body side.

Furthermore, an electrical contact arrangement 37, which is connected to the connecting portion 7f of the brush holder 7, is provided to the mount surface 31a. Specifically, the connecting portion 7f of the brush holder 7 is arranged in the receiving recess 26a of the cover 26, and an electrical contact arrangement 12a of the connecting portion 7f is connected to the electrical contact arrangement 37 provided on the mount surface 31a. In this way, the electrical power supply, which is provided from the vehicle body side through the connector 36, is supplied to the power supply brushes 8 of the brush holder 7 through the control circuit member 25.

The drive control IC 41 is mounted to the mount surface 31b of the base 31 on the circuit receiving portion 21e side (the gear housing 21 side) of the base 31. As shown in FIG. 4, the drive control IC 41 includes an IC main body 41a and a plurality of electrical lead contacts 41b. The IC main body 41a is shaped into a generally rectangular plate form. The lead contacts 41b protrude from the IC main body 41a in a longitudinal direction of the IC main body 41a. The IC main body 41a includes a drive circuit and a control circuit, which are formed as a single chip or multiple chips and are resin molded. The drive circuit includes, for example, a power MOSFET and supplies the drive electric current to the motor main body 2. The control circuit performs, for example, the PWM control operation and a pinching limiting control operation for limiting pinching of an object by the window glass. The lead contacts 41b are connected to the circuits of the IC main body 41a. A plurality of terminals (not shown) is embedded (insert molded) in the base 31, and the lead contacts 41b are welded to predetermined parts of the terminals. The drive control IC 41 is connected to the choke coil 32, the capacitors 33, 34, the contacts 35a of the connector 36 and the electrical contact arrangement 37 of the brush holder 7 through the terminals embedded into the base 31.

Furthermore, as shown in FIG. 4, an extension piece 31c is formed in the base 31 to extend to a point adjacent to the rotatable shaft 10, more specifically to a point adjacent to the sensor magnet 24b of the driving side rotatable body 24a of the clutch 24. A Hall IC 42 is installed to the extension piece 31c. The Hall IC 42 is welded to predetermined points of the terminals of the base 31 and is connected to the drive control IC 41 through the terminals of the base 31. The Hall IC 42 senses a rotational position of the rotatable body 24a and thereby of the rotatable shaft 10, which is rotated integrally with the rotatable body 24a, based on a change in the magnetic field of the sensor magnet 24b upon rotation of the rotatable body 24a. A signal, which indicates the sensed rotational position of the rotatable shaft 10, is outputted to the drive control IC 41.

The drive control IC 41 senses the rotational position of the rotatable shaft 10 and thereby an operational position (e.g., an open position, an closed position and/or an intermediate position therebetween) of the window glass and/or the rotational speed of the rotatable shaft and thereby the moving speed (e.g., an opening speed and/or a closing speed) of the window glass based on the rotation measurement signal supplied from the Hall IC 42. Based on these measurement signals, the drive control IC 41 performs the PWM control operation of the motor 1 (the motor main body 2) and the pinching limiting control operation for limiting the pinching of the object by the window glass.

Figure 6:
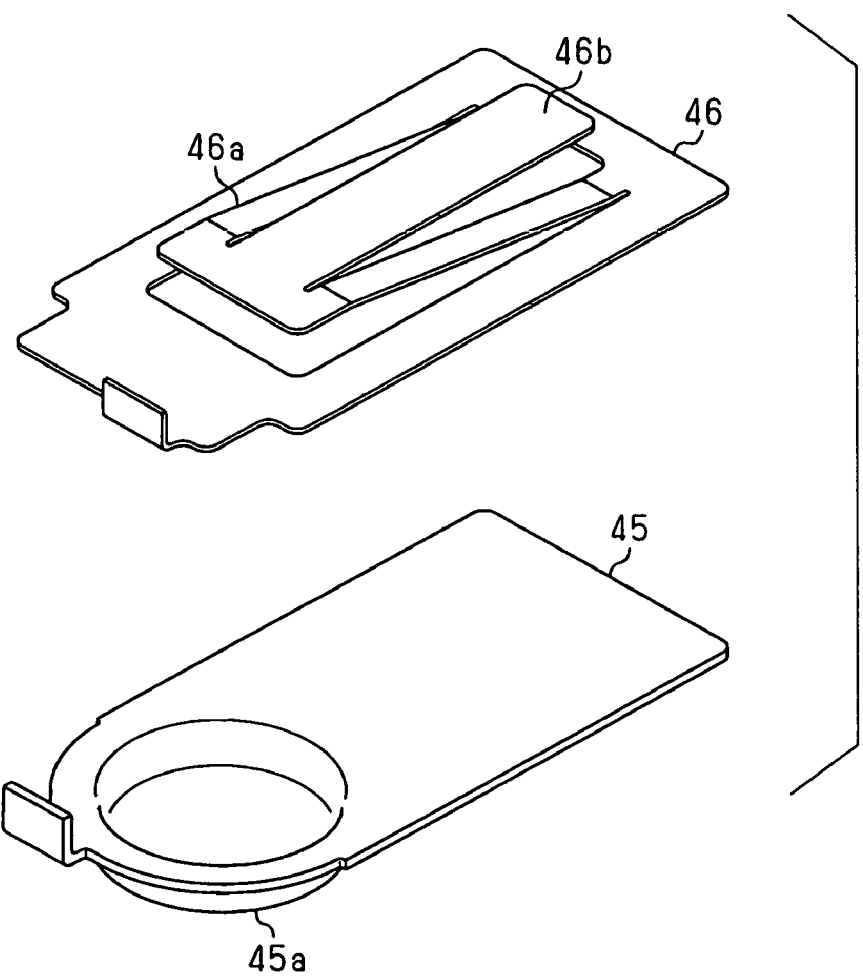
FIG. 6 is a perspective view showing heat releasing members of the motor.

As shown in FIG. 5, first and second heat releasing members 45, 46 shown in FIG. 6 for greater detail are provided in a space between the drive control IC 41 and a bottom surface of an inner wall of the circuit receiving portion 21e (the receiving recess 21f). The first heat releasing member 45 is positioned to contact the bottom surface of the receiving recess 21f, and the second heat releasing member 45 is positioned to contact a side surface (a surface, which is opposite from the base 31) of the drive control IC 41.

Figure 3:
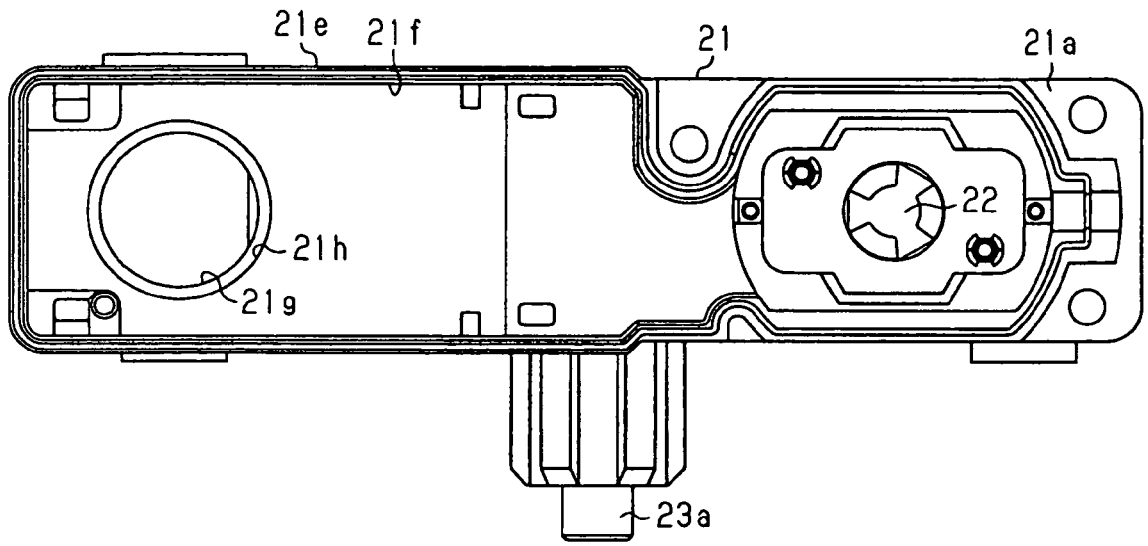
FIG. 3 is a plan view of an opening of a gear housing of the motor seen from a brush holder side thereof.

The first heat releasing member 45 is made from a metal rectangular plate, which generally corresponds to the rectangular cross section of the receiving recess 21f. An embossed protrusion (an exposing portion) 45a, which has a generally circular cross section, is formed in one longitudinal end of the first heat releasing member 45. At the time of installing the first heat releasing member 45, a seal ring 47, which is made of an elastic material, is installed to an outer peripheral surface of the protrusion 45a. As shown in FIG. 3, a circular bottom opening 21g, which corresponds to the protrusion 45a, is formed in the bottom surface of the receiving recess 21f, at which the first heat releasing member 45 is positioned. A stepped receiving portion 21h is arranged on an interior side of the bottom opening 21g, i.e., on the receiving recess 21f side of the bottom opening 21g in the axial direction. The stepped receiving portion 21h is stepped from the bottom opening 21g such that an inner diameter of the stepped receiving portion 21h is larger than an inner diameter of the bottom opening 21g to limit removal of the seal ring 47 through the bottom opening 21g. The first heat releasing member 45 is placed over the bottom surface of the receiving recess 21f, so that the protrusion 45a, to which the seal ring 47 is installed, is fitted to the bottom opening 21g and is thereby exposed outward from an opening end of the bottom opening 21g. At that time, the seal ring 47 is received in the stepped receiving portion 21h and is tightly engaged with the bottom opening 21g and the protrusion 45a to seal therebetween.

The second heat releasing member 46 is made of the rectangular metal plate (made of the metal material, which is the same as or different from the metal material of the first heat releasing member 45), which is shaped to generally coincide with the rectangular cross section of the receiving recess 21f. A resilient contact piece (a resilient contact portion) 46a is formed in the center of the second heat releasing member 46.

The resilient contact piece 46a is formed by cutting and bending the resilient contact piece 46a from the rest of the rectangular metal plate of the second heat releasing member 46 to form a Z-shaped body in the side view of the second heat releasing member 46. The second heat releasing member 46 is placed over the first heat releasing member 45 in such a manner that a planar contact part 46b of the resilient contact piece 46a resiliently contacts the opposed side surface of the drive control IC 41 to urge the drive control IC 41 in the assembling direction A of the speed reducer 3 and the motor main body 2, i.e., in the direction parallel to the axial direction of the rotatable shaft 10. At this time, the contact part 46b of the resilient contact piece 46a forms a surface-to-surface contact of a predetermined size with respect to the drive control IC 41.

As shown in FIG. 2, the first and second heat releasing members 45, 46 are placed one after another on the bottom surface of the receiving recess 21f before the assembling of the motor main body 2 and the speed reducer 3. In a preinstalled state where the control circuit member 25 is preinstalled to the brush holder 7, the motor main body 2 and the speed reducer 3 are assembled together. Thus, simultaneously with assembling the motor main body 2 and the speed reducer 3 together, the resilient contact piece 46a (the contact part 46b) of the second heat releasing member 46 contacts the drive control IC 41.

Although slight movement of the first and second heat releasing members 45, 46 in the receiving recess 21f is permitted, the position of the first and second heat releasing members 45, 46 will not substantially deviate from its designated position at the time of the assembling of the motor main body 2 and the speed reducer 3 together due to the fact that the rectangular shapes of the first and second heat releasing members 45, 46 generally coincide with the rectangular cross section of the receiving recess 21f. That is, the engaged state between the first and second heat releasing members 45, 46 and the engaged state between the second heat releasing member 46 and the drive control IC 41 are effectively maintained.

At the time of operating the motor 1, i.e., at the time of operating the drive control IC 41, heat is generated from the drive control IC 41. The heat generated from the drive control IC 41 is transmitted from the resilient contact piece 46a to the rest of the second heat releasing member 46 and thereafter to the first heat releasing member 45. At this time, the contact part 46b of the resilient contact piece 46a forms the surface-to-surface contact against the drive control IC 41, so that the heat absorbing effect for absorbing the heat from the drive control IC 41 is relatively high. Furthermore, the first heat releasing member 45 and the second heat releasing member 46 are stacked one after another, so that the heat is effectively transmitted from the second heat releasing member 46 to the first heat releasing member 45. In addition, the protrusion 45a of the first heat releasing member 45 is exposed outward from the bottom opening 21g of the gear housing 21, so that the heat is effectively released from the first heat releasing member 45 to the external environment. Therefore, with the above structure, the heat generated from the drive control IC 41 is effectively released to the external air to effectively cool the drive control IC 41.

Next, advantages of the present embodiment will be described.

(1) The first heat releasing member 45 made of the metal plate is fitted into the circuit receiving portion 21e (the receiving recess 21f), which receives the control circuit member 25. Furthermore, the second heat releasing member 46 made of the metal plate is stacked over the first heat releasing member 45, and the resilient contact piece 46a of the second heat releasing member 46 resiliently contacts the drive control IC 41 of the control circuit member 25. That is, the heat releasing member 46 absorbs the heat from the drive control IC 41, which generates the heat at the time of its operation, through the resilient contact piece 46a, and the absorbed heat is released to its surrounding from the respective heat releasing member 45, 46 to cool the drive control IC 41. The above heat releasing members 45, 46 can be easily installed to the circuit receiving portion 21e by simply fitting or placing them in the circuit receiving portion 21e. Furthermore, the resilient contact piece 46a of the heat releasing member 46 is simply engaged with the drive control IC 41. In this way, the installation of the heat releasing members 45, 46 is eased to promote the assembling of the motor.

(2) The heat releasing members 45, 46 are installed before the assembling of the motor main body 2 and the gear housing 21 (the speed reducer 3) together. Then, simultaneously with the assembling of the motor main body 2 and the gear housing 21 together, the resilient contact piece 46a of the heat releasing member 46 resiliently contacts the drive control IC 41. In this way, it is not required to separately provide a step of contacting the resilient contact piece 46a of the heat releasing member 46 to the drive control IC 41. As a result, the assembling steps of the motor 1 can be simplified.

(3) The resilient contact piece 46a of the heat releasing member 46 is urged against the drive control IC 41 in the installation direction (the assembling direction) of the gear housing 21 to the motor main body 2. That is, before the assembling of the motor main body 2 and the gear housing 21, the resilient contact piece 46a protrudes from the rest of the heat releasing member 46 due to its resilient force. The direction of the protrusion of the resilient contact piece 46a coincides with the installation direction of the gear housing 21 to the motor main body 2. Thus, the resilient contact piece 46a will not be caught by the other component(s) at the time of the assembling of the motor main body 2 and the gear housing 21 together. In this way, it is possible to limit an increase in a level of complexity of the assembling of the motor main body 2 and the gear housing 21.

(4) Heat tends to be accumulated in the interior of the circuit receiving portion 21e, which is formed integrally with the resin gear housing 21. Thus, in the case of receiving the heat releasing members 45, 46 in the circuit receiving portion 21e, the bottom opening 21g is formed in the circuit receiving portion 21e, and the protrusion 45a, which is exposed outside from the bottom opening 21g of the circuit receiving portion 21e, is provided in the heat releasing member 45. In this way, even in the case where the heat releasing members 45, 46 are received in the circuit receiving portion 21e, which tends to accumulate the heat therein, the protrusion 45a of the heat releasing member 45 can effectively release the heat to the external environment. Therefore, the drive control IC 41 can be effectively cooled.

(5) The first heat releasing member 45, which has the protrusion 45a, and the second heat releasing member 46, which has the resilient contact piece 46a and is stacked over the first heat releasing member 45, are used as the heat releasing members for releasing the heat from the drive control IC 41. In this way, the shapes of the heat releasing members 45, 46 are simplified, and there is a high degree of freedom in terms of the position and the shape of each of the protrusion 45a and the resilient contact piece 46a.

(6) The resilient contact piece 46a of the heat releasing member 46 has the contact part 46b, which forms the surface-to-surface contact with the drive control IC 41. Thus, the ability of the heat releasing member 46 to absorb the heat from the drive control IC 41 is relatively high. With this feature, the drive control IC 41 can be further effectively cooled.

(7) The metal plates are used to form the heat releasing members 45, 46. Thus, the protrusion 45*a* of the first heat releasing member 45 can be easily formed by a drawing process (press working), and the resilient contact piece 46 of the second heat releasing member 46 can be easily formed by the cutting and bending through press working.

(8) The circuit receiving portion 21*e*, which is formed integrally in the gear housing 21, and the cover 26, which closes the opening of the circuit receiving portion 21*e*, form the circuit receiving case, which receives the control circuit member 25. In this way, an increase in the number of the components of the motor 1 is effectively limited. Also, at the time of changing a design specification of the control circuit member 25, it is easy to modify the shape of the cover 26, which is provided separately.

Second Embodiment

A second embodiment of the present invention will be described in view of the accompanying drawings. In the following description, the components similar to those of the first embodiment will be indicated by the same numerals and will not be described further.

Figure 7:
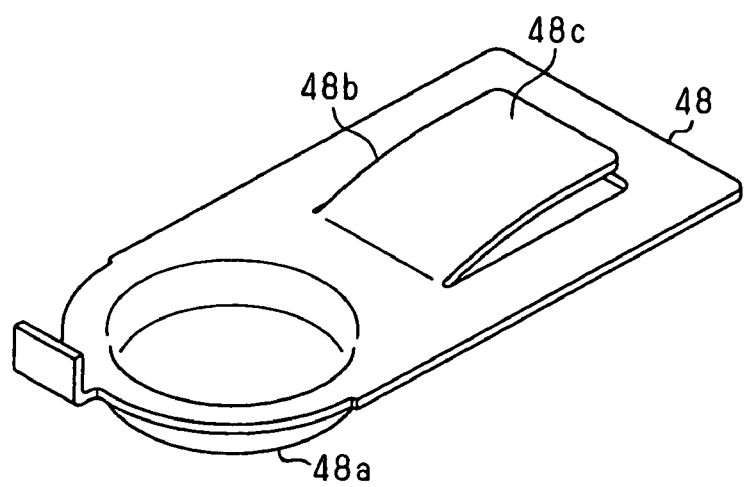
FIG. 7 is a perspective view showing a heat releasing member according to a second embodiment of the present invention.
Figure 8:
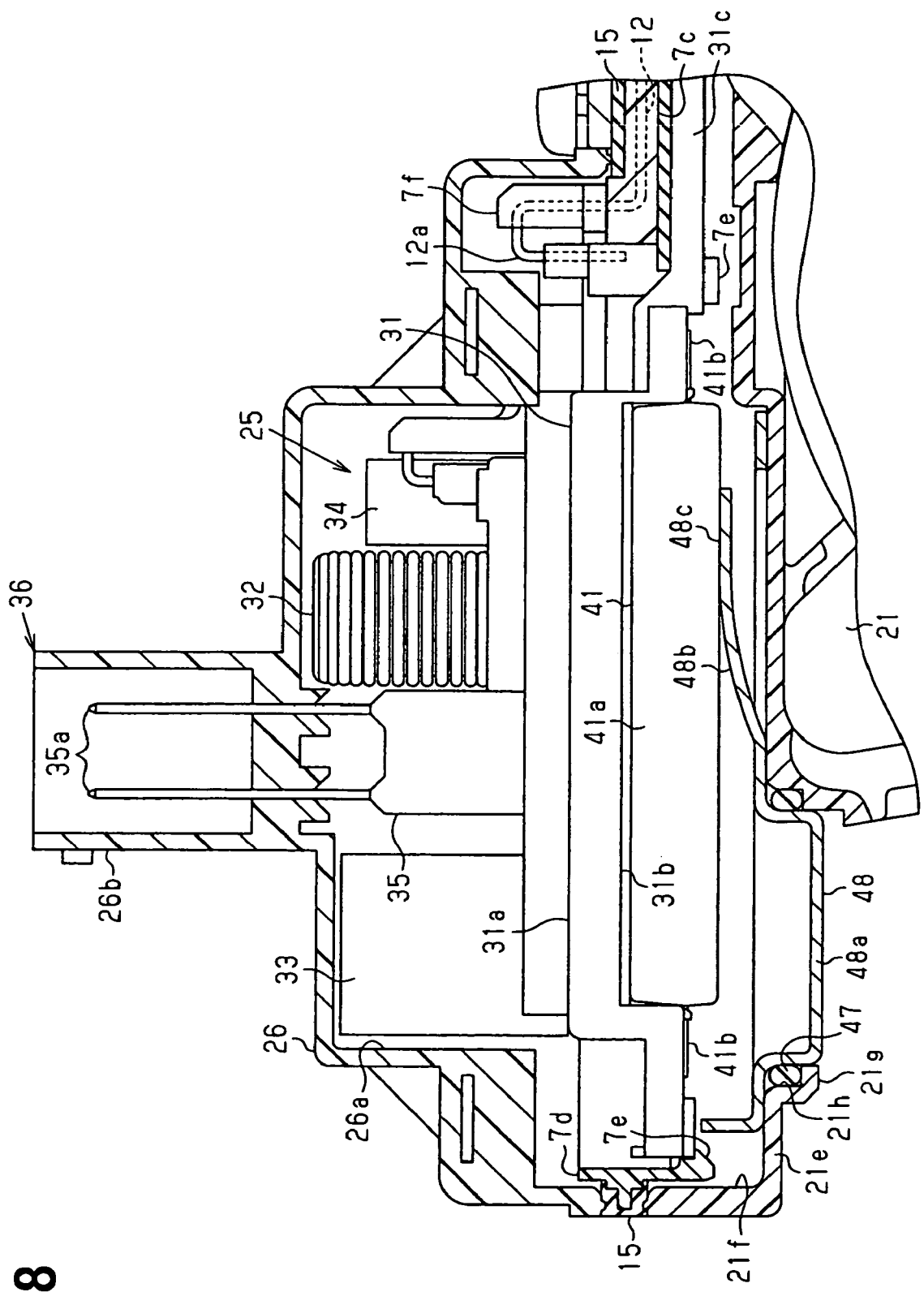
FIG. 8 is a partial enlarged view of the motor, showing a control circuit member and components therearound according to the second embodiment.

As shown in FIGS. 7 and 8, a single heat releasing member 48 is used in the present embodiment. The heat releasing member 48 is made of a rectangular metal, which generally corresponds to the cross sectional shape of the receiving recess 21*f* of the gear housing 21. A protrusion 48*a*, which has a circular cross section, is formed at one longitudinal end part of the heat releasing member 48. Furthermore, a resilient contact piece (a resilient contact portion) 48*b* is formed at the other longitudinal end part of the heat releasing member 48 by cutting and bending the resilient contact piece 48*b* from its surrounding. A distal end portion of the resilient contact piece 48*b* forms a contacting part 48*c*, which forms a surface-to-surface contact with the drive control IC 41.

The heat releasing member 48 is placed over the bottom surface of the receiving recess 21*f* before the assembling of the motor main body 2 relative to the speed reducer 3. The protrusion 45*a*, which is provided with the seal ring 47 around its outer peripheral surface, is fitted to and is exposed outside from the bottom opening 21*g*. Thereafter, when the motor main body 2 and the speed reducer 3 are assembled together, the planar contact part 48*c* of the resilient contact piece 48*b* resiliently contacts the opposed side surface of the drive control IC 41 to form the surface-to-surface contact of the predetermined size.

In this way, even in this embodiment, the installation of the heat releasing member 48, which releases the heat from the drive control IC 41, is eased. Furthermore, the heat, which is generated from the drive control IC 41, is effectively released to the external air through the heat releasing member 48. With the above structure, the drive control IC 41 can be effectively cooled.

Furthermore, in the present embodiment, the protrusion 48*a* and the resilient contact piece 48*b* are integrally provided in the single heat releasing member 48. Thus, in comparison to the first embodiment, the installation of the heat releasing member 48 is further eased, and the number of the components of the motor 1 can be advantageously reduced.

Third Embodiment

A third embodiment of the present invention will be described in view of the accompanying drawing. In the following description, components similar to those of the above embodiments will be indicated by the same numerals and will not be described further.

Figure 9:
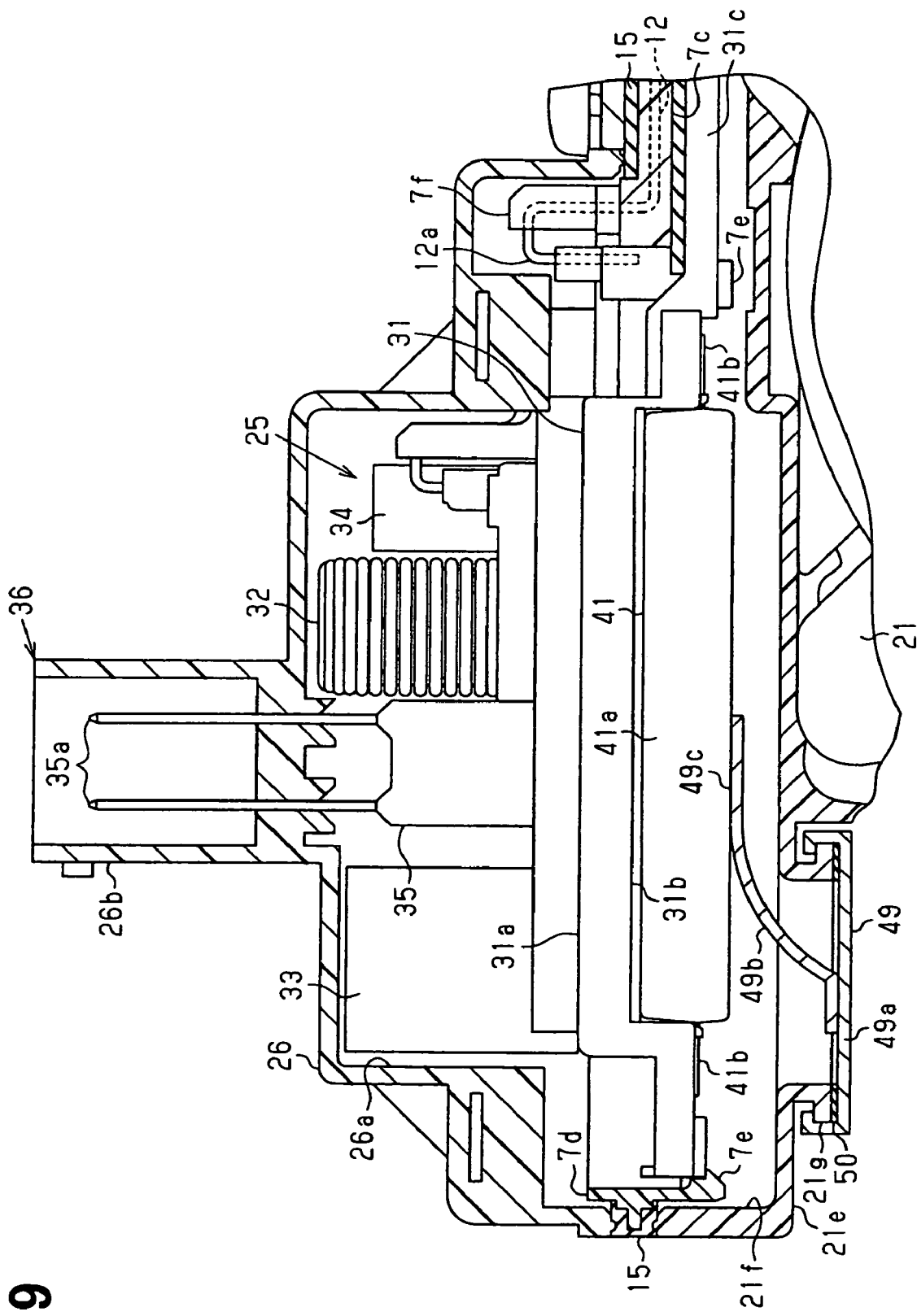
FIG. 9 is a partial enlarged view of a motor according to a third embodiment of the present invention, showing a control circuit member and components therearound.

As shown in FIG. 9, similar to the second embodiment, a single heat releasing member 49 is provided in this embodiment. The heat releasing member 49 includes a cover portion 49*a* and a generally planar resilient contact piece (a generally planar contact portion) 49*b*, which is generally planar in an unloaded free state. The cover portion 49*a* is detachably installed to and is engaged to an outer peripheral surface of a distal end of the bottom opening 21*g* of the gear housing 21 to close the bottom opening 21*g*. The resilient contact piece 49*b* is securely welded to an inner surface of the cover portion 49*a*. A distal end portion of the resilient contact piece 49*b* forms a contact part 49*c*, which forms a surface-to-surface contact with the drive control IC 41.

Before the assembling of the motor main body 2 to the speed reducer 3, the resilient contact piece 49*b* of the heat releasing member 49 is inserted into the bottom opening 21*g*, and the cover portion 49*a* is fitted to the bottom opening 21*g*. At this time, a seal ring 50, which is made of an elastic material (e.g., an elastomer), is interposed between an end surface of the bottom opening 21*g* and the cover portion 49*a*. Thereafter, when the motor main body 2 and the speed reducer 3 are assembled together, the planar contacting part 49*c* of the resilient contact piece 49*b* resiliently contacts the opposed side surface of the drive control IC 41 to form the surface-to-surface contact of the predetermined size. Alternatively, after the assembling of the motor main body 2 to the speed reducer 3, the resilient contact piece 49*b* of the heat releasing member 49 may be inserted into the bottom opening 21*g*, and the cover portion 49*a* may be installed to the bottom opening 21*g* to resiliently contact the resilient contact piece 49*b* against the drive control IC 41.

In this way, even in this embodiment, the installation of the heat releasing member 49, which releases the heat from the drive control IC 41, is eased. Furthermore, the heat, which is generated from the drive control IC 41, is effectively released to the external air through the heat releasing member 49. With the above structure, the drive control IC 41 can be effectively cooled.

Furthermore, in the present embodiment, the single heat releasing member 49 is provided. Thus, the installation of the heat releasing member 49 can be eased, and the number of the components of the motor 1 can be reduced.

Fourth Embodiment

A fourth embodiment of the present invention will be described in view of the accompanying drawing. In the following description, components similar to those of the above embodiments will be indicated by the same numerals and will not be described further.

Figure 10:
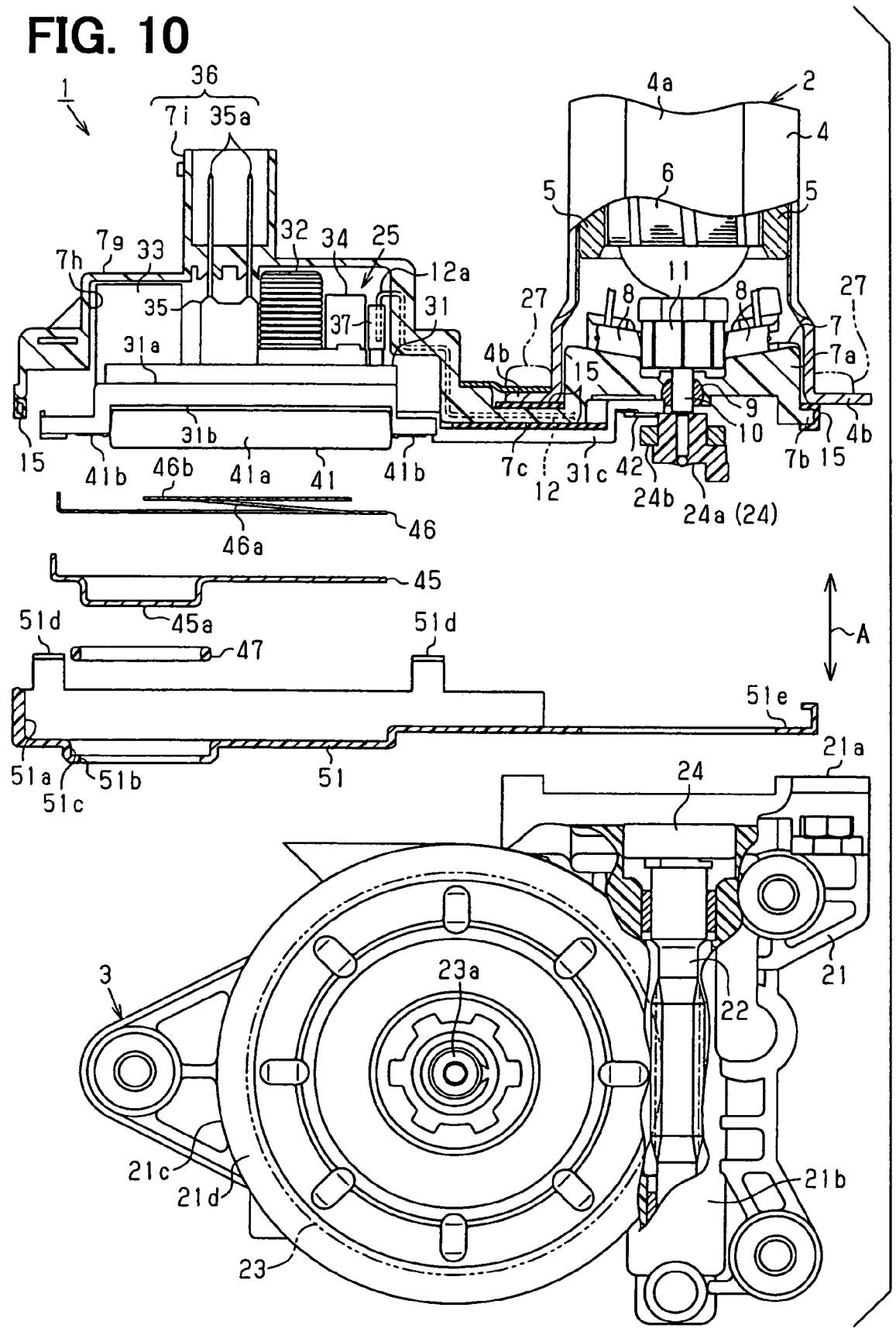
FIG. 10 is a partially cross sectional exploded view of a motor according to a fourth embodiment of the present invention, showing a state of the motor before assembling thereof.

In the first embodiment, the circuit receiving portion 21*e* is formed integrally in the gear housing 21, and the separate cover 26 is installed to the circuit receiving portion 21*e*. In the present embodiment, as shown in FIG. 10, a circuit receiving member 51 made of resin is formed separately from the gear housing 21 and is installed to the gear housing 21. Furthermore, a cover, which closes an opening of the circuit receiving member 51 (a receiving recess 51*a*), is formed integrally with the brush holder 7 as a cover portion 7*g*.

The circuit receiving member 51 includes the receiving recess 51*a*, a bottom opening 51*b* and a stepped receiving portion 51*c*, which are similar to those of the first embodiment. A generally lower half of the control circuit member 25 is received in the receiving recess 51*a*. A plurality of engaging pieces (engaging claws) 51d, which are engaged with an outer surface of the cover portion 7g of the brush holder 7, is provided in the circuit receiving member 51 of the present embodiment. Furthermore, an installation piece 51e is provided in the circuit receiving member 51. At the time of assembling the motor main body 2 and the speed reducer 3 together, the installation piece 51e is clamped between the gear housing 21 and the brush holder 7 or the yoke 4. The circuit receiving member 51 is installed to the motor 1 by the engaging pieces 51d and the installation piece 51e.

The cover portion 7g of the brush holder 7 includes a receiving recess 7h and a connector case portion 7i, which are similar to those of the first embodiment. The rest of the control circuit member 25 is received in the receiving recess 7h. A seal member 15, which is made of an elastic material (e.g., an elastomer), is provided to the opening of the receiving recess 7h, which is engaged with the opening of the circuit receiving member 51 (the receiving recess 51a), to seal between the opening of the receiving recess 7h and the opening of the circuit receiving member 51.

The first heat releasing member 45 is fitted into the receiving recess 51a of the circuit receiving member 51 in such a manner that the protrusion 45a is exposed outside of the receiving member 51 from the bottom opening 51b. Furthermore, the second heat releasing member 46 is stacked over the first heat releasing member 45. When the circuit receiving member 51 is installed to the cover portion 7g of the brush holder 7, the resilient contact piece 46a (the contact part 46b) of the second heat releasing member 46 contacts the drive control IC 41.

In this way, even in this embodiment, the installation of the heat releasing members 45, 46, which release the heat from the drive control IC 41, is eased. Furthermore, the heat, which is generated from the drive control IC 41, is effectively released to the external air through the heat releasing members 45, 46. With the above structure, the drive control IC 41 can be effectively cooled.

Furthermore, the circuit receiving member 51, which is installed to the brush holder 7 (the cover portion 7g), and the cover portion 7g, which is formed integrally in the brush holder 7 to close the opening of the circuit receiving member 51, form the circuit receiving case, which receives the control circuit member 25. In this way, an increase in the number of the components of the motor 1 is effectively limited. Also, at the time of changing a design specification of the control circuit member 25, it is easy to modify the shape of the circuit receiving member 51, which is provided separately from the gear housing 21.

Fifth Embodiment

A fifth embodiment of the present invention will be described in view of the accompanying drawing. In the following description, components similar to those of the above embodiments will be indicated by the same numerals and will not be described further.

Figure 11:
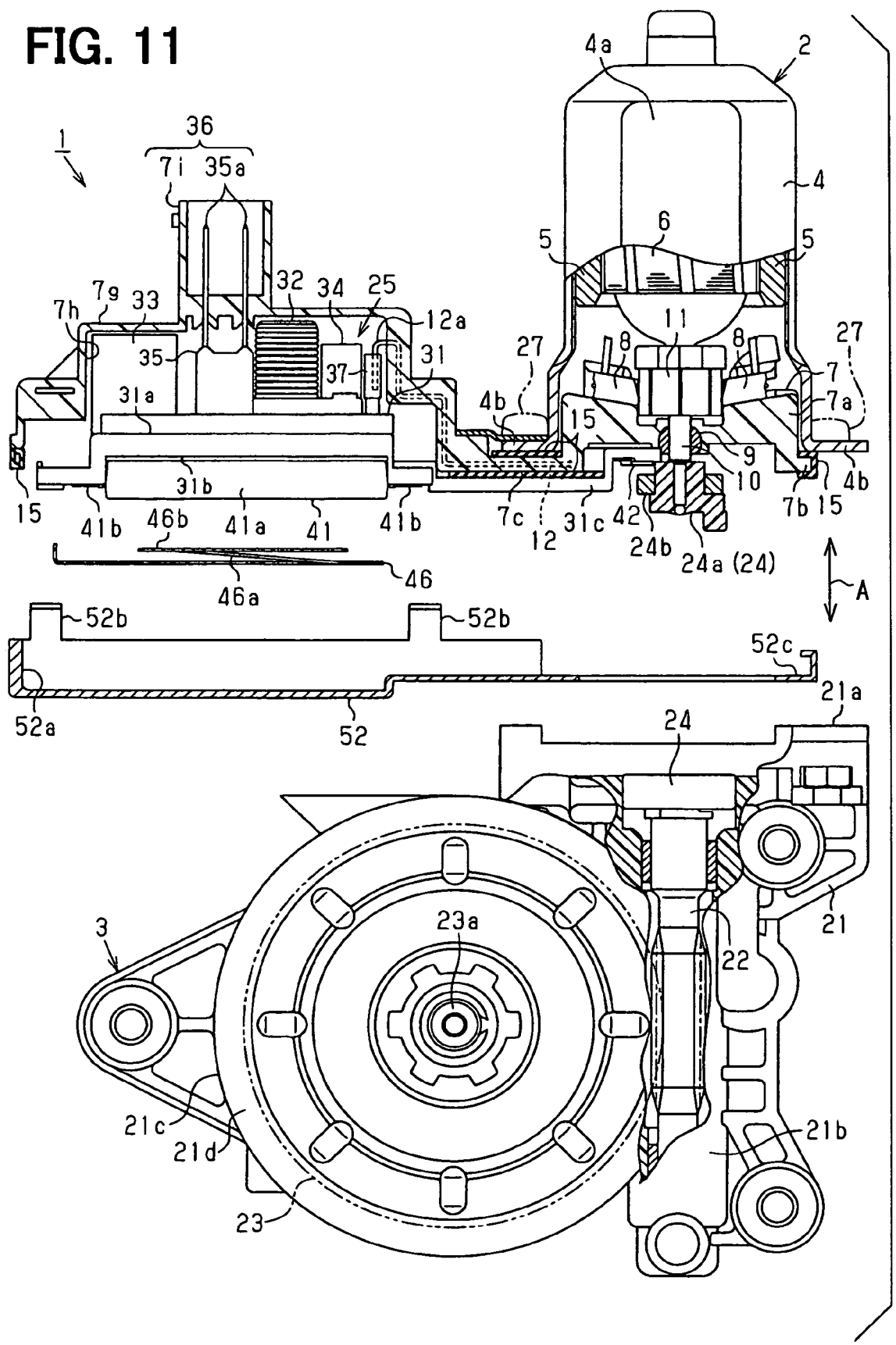
FIG. 11 is a partially cross sectional exploded view of a motor according to a fifth embodiment of the present invention, showing a state of the motor before assembling thereof.

As shown in FIG. 11, similar to the fourth embodiment, a circuit receiving member 52, which is formed separately from the gear housing 21, is installed to the gear housing 21. Unlike the fourth embodiment, the circuit receiving member 52 is made of a metal material (a metal plate material), which is capable of effectively releasing the heat. With this construction, the merit of providing the bottom opening 51b, from which the portion (the protrusion 45a) of the first heat releasing member 45 is exposed, is reduced. Thus, in the present embodiment, the bottom opening 51b and the first heat releasing member 45 are both eliminated, and only the second heat releasing member 46 is placed over a bottom surface of a receiving recess 52a of the circuit receiving member 52. The circuit receiving member 52 of the present embodiment includes the receiving recess 52a, engaging pieces (engaging claws) 52b and an installation piece 52c, which are similar to those of the fourth embodiment.

In this way, even in this embodiment, the installation of the heat releasing member 46, which releases the heat from the drive control IC 41, is eased. Furthermore, the heat, which is generated from the drive control IC 41, is effectively released to the external air through the heat releasing member 46 in corporation with the metal circuit receiving member 52. With the above structure, the drive control IC 41 can be effectively cooled.

Furthermore, in the present embodiment, the single heat releasing member 46 is provided. Thus, the installation of the heat releasing member 46 can be eased, and the number of the components of the motor 1 can be reduced.

The above embodiment can be modified as follows.

In the first to third embodiments, the circuit receiving case, which receives the control circuit member 25, is formed by the circuit receiving portion 21e, which is formed integrally with the gear housing 21, and the cover 26, which is formed separately from the gear housing 21. In the fourth and fifth embodiments, this circuit receiving case is formed by the circuit receiving member 51, 52, which is formed separately from the brush holder 7 and is installed to the brush holder 7, and the cover portion 7g, which is formed integrally in the brush holder 7. Alternatively, the circuit receiving case, which receives the control circuit member 25, may be formed by the circuit receiving portion 21e, which is formed integrally with the gear housing 21, and the cover portion 7g, which is formed integrally in the brush holder 7. Further alternatively, the circuit receiving case may be formed by the circuit receiving member 51, 52, which is formed separately from the brush holder 7 and is installed to the brush holder 7, and the cover 26, which is formed separately. Furthermore, the circuit receiving member 51, 52 may be modified to be installed to the gear housing 21.

In each of the above embodiments, the drive control IC 41 is placed over the bottom mount surface 31b of the base 31. However, in a case where the orientation of the connector 36 is changed from that of the above embodiments, the drive control IC 41 may be placed over the top mount surface 31a of the base 31.

In each of the above embodiments, the respective heat releasing member 45, 46, 48, 49 is made of the corresponding metal plate material. Alternatively, any other suitable material, which is other than the metal material, may be used to form the respective heat releasing member 45, 46, 48, 49.

In each of the above embodiments, the drive control IC 41 has both of the motor drive circuit and the control circuit. Alternatively, the motor drive circuit and the control circuit may be formed as separate ICs, respectively.

In each of the above embodiments, the present invention is implemented in the motor 1 of the power window system. Alternatively, the present invention may be implemented in a motor of a sunroof system, of a slide door system, of a backdoor system or of any other suitable system or apparatus.

Additional advantages and modifications will readily occur to those skilled in the art. The invention in its broader terms is therefore not limited to the specific details, representative apparatus, and illustrative examples shown and described.

What is claimed is:

1. A motor comprising:
    a motor main body that includes a brush holder, which holds a plurality of power supply brushes;
    a gear housing that is assembled together with the motor main body and receives a speed reducing mechanism, which reduces a speed of rotation generated in the motor main body;
    a control circuit member that is installed to the brush holder, wherein the control circuit member includes a drive control IC and is electrically connected to the brush holder to control the rotation of the motor main body through the plurality of power supply brushes;
    a circuit receiving case that receives the control circuit member; and
    at least one heat releasing member that is made of metal and is fitted to or is placed over a portion of the circuit receiving case such that the at least one heat releasing member is connected to the drive control IC to release heat from the drive control IC, wherein the at least one heat releasing member includes a resilient contact portion, which resiliently contacts the drive control IC, and the resilient contact portion is cut and is bent from a rest of the corresponding heat releasing member, which is produced from a metal plate material.

2. The motor according to claim 1, wherein the resilient contact portion exerts an urging force against the drive control IC in an assembling direction for assembling the motor main body relative to the gear housing.

3. The motor according to claim 1, wherein:
    the circuit receiving case is made of resin and has an opening; and
    the at least one heat releasing member is received in the circuit receiving case and includes an exposing portion, which is exposed outside of the circuit receiving case through the opening of the circuit receiving case.

4. The motor according to claim 3 wherein the resilient contact portion and the exposing portion are integrally provided in one of the at least one heat releasing member.

5. The motor according to claim 3, wherein the at least one heat releasing member includes:
    a first heat releasing member that includes the exposing portion; and
    a second heat releasing member that includes the resilient contact portion and contacts the first heat releasing member.

6. The motor according to claim 1, wherein:
    the circuit receiving case includes a plurality of case members;
    one of the plurality of case member is made of metal and contacts the at least one heat releasing member; and
    the at least one heat releasing member is placed over the portion of the circuit receiving case in an interior of the circuit receiving case.

7. The motor according to claim 1, wherein the resilient contact portion includes a contact part that makes a surface-to-surface contact with the drive control IC of the control circuit member.

8. The motor according to claim 1, wherein the circuit receiving case includes:
    a circuit receiving portion that is formed integrally with the gear housing; and
    a cover that closes an opening of the circuit receiving portion.

9. The motor according to claim 1, wherein the circuit receiving case includes:
    a circuit receiving member that is installed to one of the brush holder and the gear housing; and
    a cover portion that is formed integrally with the brush holder to close an opening of the circuit receiving member.

10. The motor according to claim 1, wherein the at least one heat releasing member is clamped between the drive control IC and the circuit receiving case without being fixed to the drive control IC and the circuit receiving case.

11. A motor comprising:
    a motor main body that includes a brush holder, which holds a plurality of power supply brushes;
    a gear housing that is assembled together with the motor main body and receives a speed reducing mechanism, which reduces a speed of rotation generated in the motor main body;
    a control circuit member that is installed to the brush holder, wherein the control circuit member includes a drive control IC and is electrically connected to the brush holder to control the rotation of the motor main body through the plurality of power supply brushes;
    a circuit receiving case that receives the control circuit member; and
    at least one heat releasing member that is made of metal and is fitted to or is placed over a portion of the circuit receiving case such that the at least one heat releasing member is connected to the drive control IC to release heat from the drive control IC, wherein the at least one heat releasing member includes a resilient contact portion, which resiliently contacts the drive control IC, and wherein
        the circuit receiving case includes a plurality of case members;
        one of the plurality of case member is made of metal and contacts the at least one heat releasing member; and
        the at least one heat releasing member is placed over the portion of the circuit receiving case in an interior of the circuit receiving case.

* * * * *